June 10, 1958 — B. OLCOTT — 2,838,123
COAXIAL ROTOR HELICOPTER

Filed Feb. 4, 1955 — 2 Sheets-Sheet 1

INVENTOR
Bernard Olcott

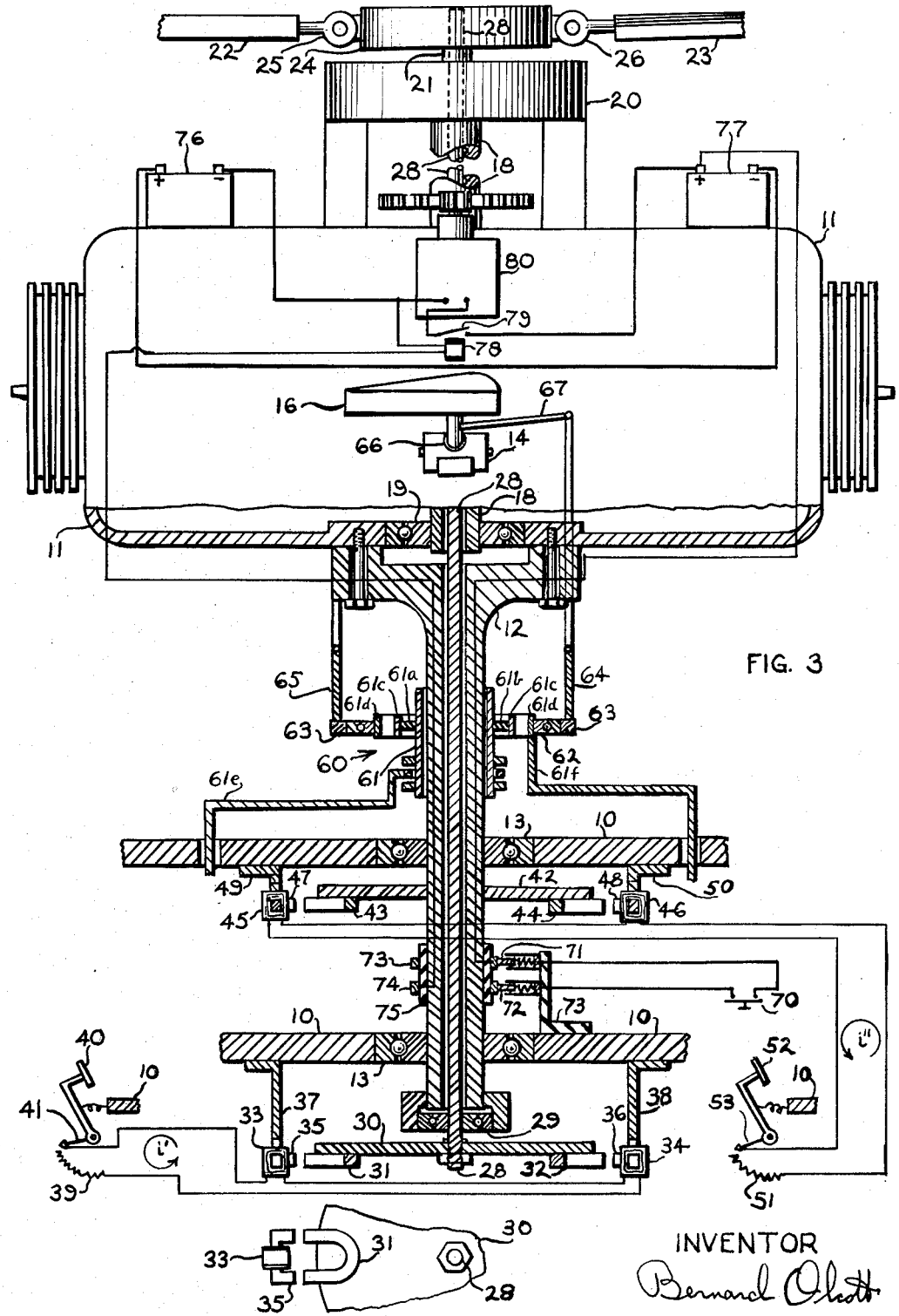

United States Patent Office 2,838,123
Patented June 10, 1958

2,838,123

COAXIAL ROTOR HELICOPTER

Bernard Olcott, Fort Worth, Tex.

Application February 4, 1955, Serial No. 486,093

8 Claims. (Cl. 170—135.26)

My invention relates to producing economical and efficient helicopters having novel and original design and configuration. Particularly, this invention is directed to low cost, low maintenance, high lift efficiency and high load capacity helicopters which employ new coaxial rotor configurations in combination with simplified gear and transmission systems.

For the developed art to date, rotating engines have been employed for coaxial rotor helicopters wherein the revolving vertical engine shaft turns a high speed relatively small diameter fixed pitch rotor, with or without the use of speed reduction gears, while the slower speed oppositely revolving engine crankcase directly drives a relatively larger diameter controllable blade pitch rotor. For this configuration the fuselage supports the engine and rotor system with the aid of a bearing or bearings which prevent the transmission of any torque or yaw from the revolving members to the fuselage Two designs of this basic configuration have been developed: in one design, the smaller rotor is driven directly by the engine shaft without the use of a speed reducer, while in the other design, the smaller rotor is driven by the engine shaft through a speed reducer.

When no speed reducer is used, the diameter of the smaller rotor is quite small because of the limitation of tip speed. With the small disk area, this design results in a poor lifting efficiency and a poor lifting capacity because the small high speed rotor utilizes most of the engine power. This latter fact follows because the torques of the two rotor systems must be equal and opposite and therefore the power division between the two rotor systems is directly proportional to the rotational speeds of the two rotors. With approximately equal tip speeds, the smaller rotor rotates very much faster than the larger diameter rotor driven by the revolving engine crankcase. The greater power absorbed by the small high speed rotor results in a very high disk loading in pounds per square foot of disk area and this condition causes both poor lifting efficiency and poor lifting capacity when practical designs are implemented.

When the design incorporates a speed reducer to drive the smaller rotor from the engine shaft, the diameter of the smaller rotor can be increased with attendant increase in lifting efficiency and lifting capacity. However, this speed reducer is expensive because it has to transmit most of the engine power since, as stated above, the higher speed rotor utilizes most of the engine power.

An object of this invention is to provide low cost, low maintenance, high lifting efficiency and high lifting capacity coaxial rotor helicopters without using a speed reducer, gears, clutch, transmission or free-wheeling coupling in the drive of the one rotor of the configuration which produces most of the total lift.

Another object of this invention is to prove the economy of coaxial rotor helicopters by eliminating the speed reducer, gears, transmission, clutch and free-wheeling coupling associated with the drive of the one rotor of the configuration which produces most of the total lift, such economies in cost being effected while maintaining high overall lift efficiency and lift capacity for the rotors.

The coaxial rotor helicopters of my invention utilize two rotors of different diameters, one driven by the engine shaft through a speed reducer and the other driven directly by the counter revolving engine crankcase. But most important, the diameter of the rotor driven by the speed reducer and engine shaft is made larger than the diameter of the rotor directly driven by the counter revolving engine crankcase. In this way, the latter rotor, which is driven without a speed reducer, gears, transmission, clutch or free-wheeling coupling, is caused to have a higher rotational speed and take more power than the rotor driven by the engine shaft through the speed reducer.

A shortcoming of the prior developed coaxial rotor helicopters described in the second paragraph is that the high speed rotor has fixed pitch blades while the slower speed larger diameter rotor has controllable pitch blades for maneuvering the helicopter. This design results in poor maneuverability for the helicopter in that the controllable rotor is utilizing but a small percentage of the total power.

Another object of my invention is to improve the maneuverability and controllability of coaxial rotor helicopters which employ a revolving engine. This is accomplished by making controllable the rotor which utilizes most of the engine power.

For the prior developed coaxial rotor helicopters described in the second paragraph, directional control of the hovering helicopter is achieved by applying a controllable amount of torque between the fuselage and either counter rotating rotor system by means of controllable brake shoes attached to the fuselage which can bear against disks attached to each rotor systems. Another shortcoming of the developed art to date is that directional control of the hovering helicopter is often erratic because the mechanical brake shoes and revolving disks tend to stick, grab and otherwise transmit non-uniform and erratic torque.

Another shortcoming of the prior developed coaxial rotor helicopters described in the second paragraph is that directional control for vertical decent during power-off condition is in one direction only because under power-off the engine shaft stops relative to the engine crankcase and the small rotor will lock and rotate with the larger rotor.

Another object of my invention is to provide improved directional control in both directions for hovering corotor revolving engine helicopters in both power-on and power-off conditions by transmitting a smooth controllable amount of torque to the fuselage from either counter-rotating rotor system through magnetic and electric systems and circuits.

Another shortcoming of the prior developed coaxial rotor helicopters described in the second paragraph is that the slip rings and brushes required to carry the very high starting current from the battery on the fuselage to the electric starting motor which is revolving with the engine crankcase are very massive and expensive. An electric starting motor whose stator is not fixed to the fuselage is required to restart the engine during flight if it should temporarily stop or stall.

Another object of my invention is to provide electric starting for the engine during flight using low current slip rings and brushes in conjunction with a starting motor whose stator is fixed to the rotating engine. This is accomplished in my invention by utilizing a sealed battery attached to the revolving engine block.

Another shortcoming of the prior developed coaxial rotor helicopters described in the second paragraph is that for the design where no speed reducer is used to drive the small rotor by the engine shaft, the high velocity stream of air from the small diameter rotor, which is highly loaded, blasts down upon the top of the fuselage with resultant loss in lift. Further, this high induced velocity is objectionable because of excessive air noise and the locally produced dust swirls.

Another object of my invention is to provide a design in which the induced velocity for either rotor can be kept at an acceptably low level.

Figure 3 is a side elevation view, partly in section, of a portion of Figure 2 showing the mechanisms and controls associated with the support of rotating engine. In order to clearly explain these mechanisms and controls as well as to show their relationship with other components of my invention, the usual components of the helicopter configuration are omitted from the drawing.

Figure 1:
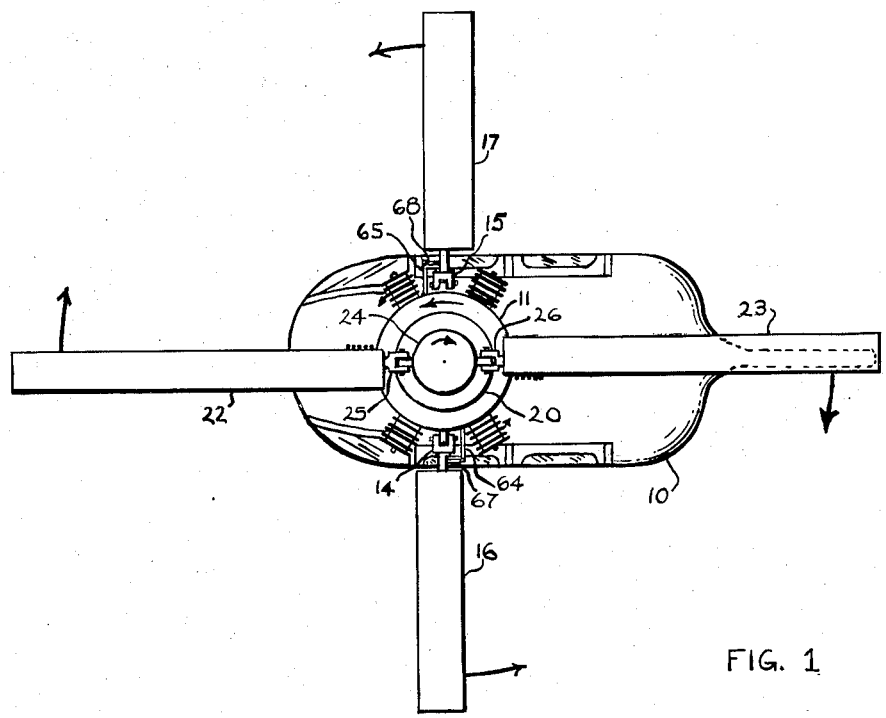
Figure 1 is a plan view of a coaxial rotor rotating engine configuration of a helicopter in accordance with this invention.
Figure 2:
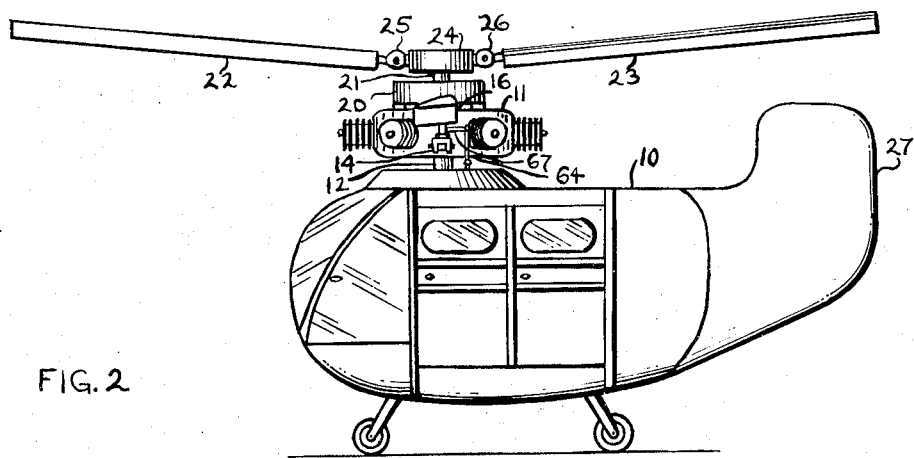
Figure 2 is an elevation of the helicopter of Figure 1.

Referring to the drawings in detail, wherein like characters of reference denote corresponding parts in Figures 1, 2 and 3, a fuselage and associated structural frame 10 rotatably support an engine body or crankcase 11 mounted on an extension shaft 12, the shaft 12 being journaled in combination radial and thrust bearings 13. Attached to the crankcase 11 by means of flapping hinges 14 and 15 is a controllable blade pitch rotor having blades 16 and 17. The engine shaft 18 supported in crankcase 11 by means of bearing 19 drives a pinion in speed reducer 20, the body of the latter being attached to engine crankcase 11, and the low R. P. M. output shaft 21 of speed reducer 20 drives another rotor having blades 22 and 23 through free-wheeling coupling 24. Flapping hinges 25 and 26 may be used to reduce the gyroscopic action of rotor blades 22 and 23. Rotor blades 22 and 23 have a diameter larger than the diameter of rotor blades 16 and 17 in order to transfer the major part of the engine horsepower to the controllable rotor. During power-off conditions, the engine shaft 18 and speed reducer shaft 21 will stop rotating relative to engine crankcase 11. However, the two rotor systems will autorotate by wind power. The free-wheeling coupling 24 will permit the blades 22 and 23 to freely autorotate while the blades 16 and 17 freely autorotate on bearings 13. In Figures 1 and 2, a fin tail surface 27 is attached to the fuselage frame 10 to improve the directional stability of the helicopter in forward flight.

In Figure 3, a shaft 28 is attached to and rotates with the side of the free-wheeling coupling 24 which is attached to rotor blades 22 and 23. This shaft 28 passes through, but does not touch or interfere with rotating engine shaft 18 and crankcase supporting shaft 12. The lower end of shaft 28 is supported by bearing 29, the outer race of which is supported in shaft 12. This shaft 28 is attached to and drives disk 30 which has fixed to it a number of permanent magnets, two of which, 31 and 32 are shown. In magnetic inductive relationship to revolving magnets 31 and 32 are two coils 33 and 34 wound on iron cores 35 and 36. The coils and iron cores are fixed to the fuselage frame 10 by means of brackets 37 and 38. The windings of coils 33 and 34 are connected in series to form a closed electrical circuit with a variable resistance 39, the slider of the latter being movable by the right rudder foot pedal 40 and insulating arm 41. The right rudder foot pedal 40 is spring loaded to normally maintain maximum resistance in variable resistance 39 or to open-circuit it. Hence it can be seen that depressing the right rudder pedal 40 will first close the electrical circuit consisting of stator windings 33 and 34 and resistance 39. The flux of the revolving magnets 31 and 32 will induce voltages in the stator windings 33 and 34 and this voltage acting on the closed circuit will cause a current $i'$ to flow. This flowing electric current $i'$ will produce a magnetmotive force in windings 33 and 34 which will react on revolving magnets 31 and 32 in such a manner that a selected amount of torque is transmitted from the top rotor blades 22 and 23 to the fuselage 10 as determined by the current $i'$ flowing in windings 33 and 34 and resistance 39. When the right pedal 40 is further depressed, variable resistance 39 is reduced and the current in the closed circuit increases. This increased current will increase the amount of torque transmitted from the rotor blades 22 and 23 to the fuselage 10. During power-off descent, the free-wheeling coupling 24 permits the rotors 22 and 23 and disk 30 to continue to rotate and as a consequence right pedal 40 remains effective in providing right directional control. To provide left directional control, a disk 42 with attached permanent magnets 43 and 44 is attached to the shaft 12, the latter being attached to and revolving with engine crankcase 11. In magnetic inductive relationship to revolving magnets 43 and 44 are two coils 45 and 46 wound on iron cores 47 and 48. The coils and iron cores are fixed to fuselage frame 10 by means of brackets 49 and 50. The windings of coils 45 and 46 are connected in series to form a closed electrical circuit with a variable resistance 51, the slider of the latter being movable by the left rudder foot pedal 52 and insulating arm 53. The left rudder foot pedal 52 is spring loaded to normally maintain maximum resistance in variable resistance 51 or to open-circuit it. Hence it can be seen that depressing the left rudder pedal 52 will first close the electrical circuit consisting of stator windings 45 and 46 and resistance 51. The flux of the revolving magnets 43 and 44 will induce voltages in the stator windings 45 and 46 and this voltage acting on the closed electrical circuit will cause a current $i''$ to flow. This flowing electric current $i''$ will produce a magnetomotive force in windings 45 and 46 which will react on revolving magnets 43 and 44 in such a manner that a selected amount of torque is transmitted from the revolving crankcase 11 to the fuselage 10 as determined by the current $i''$ in windings 45 and 46 and resistance 51. When the left rudder pedal 52 is further depressed, variable resistance 51 is reduced and the current in the closed circuit is increased. This increased current will increase the amount of torque transmitted from the revolving crankcase 11 to the fuselage 10. During power-off descent, the rotor blades 16 and 17 will rotate engine crankcase 11 and disk 42 by wind power and as a consequence left rudder pedal 52 will remain effective for left directional control.

The controllable rotor blades 16 and 17 can be controlled in a number of known manner. One cyclic pitch control method as illustrated in "Aerodynamics of the Helicopter," Gessow & Myers, MacMillan Co., 1952, Fig. 2–13, page 29, has been incorporated into the drawings. In Fig. 3 is shown a swash plate mechanism 60 with collective pitch sleeve 61. A pair of oppositely disposed pins 61a and 61b connects an inner ring 61c of a gimbaled pair of concentric rings to the collective pitch sleeve 61. Another pair of oppositely disposed pins (not shown) connects the inner ring of the gimbaled pair of rings to its outer ring 61d in the plane at right angles to the plane of Fig. 3. A ball bearing 62 is fixed at its inner race to the outer ring and carries an annular member 63 secured to its outer race. The annular member 63, which corresponds to an outer or upper swash plate, is operatively connected to the revolving rotor blades 16 and 17 by linkages 64 and 65. Rotor blade 16 is free to feather in feather bearing 66 and its blade pitch is controlled by crank 67 in association with linkage 64. Rotor blade 17 is identical with 16 and its blade pitch is controlled by linkage 65 and an associated crank 68. For simultaneously changing the pitch of both the blades 16 and 17, the collective pitch sleeve 61 is selectively positioned laterally along the shaft 12 with a linkage system 61e which is actuated by a collective pitch lever in the pilot's compartment. For cyclically controlling the pitch of these blades, the inner race of the ball bearing 62, which corresponds to the inner or lower swash plate, is selectively tilted in a universal manner about the two pair of pins associated with the gimbaled rings without moving the collective pitch sleeve by two rods and associated linkages. One of the rods 61f engages the outer gimbaled ring while the other rod (not shown) engages the outer gimbaled ring in the plane at right angles to that of Fig. 3. A cyclic control stick in the pilot's compartment actuates these rods in a known manner by levers and linkages.

The engine can be started, or restarted in flight when the engine temporarily stops or stalls, by depressing push-button 70 which will electrically connect together conducting brushes 71 and 72, the latter being insulated from each other and the fuselage 10 by insulating bracket 73. The brushes 71 and 72 are in sliding electrical contact with electrically conducting concentric rings 73 and 74 which rotate with shaft 12. These rings 73 and 74 are insulated from each other and from the shaft 12 by insulation 75. The rings 73 and 74 make up a closed electric circuit consisting of two batteries 76 and 77 and the solenoid coil of relay 78 so that depressing push button 70 will cause the armature of relay 78 to close contacts 79. Batteries 76 and 77 are storage batteries of the sealed type which do not require the addition of electrolyte and these batteries as well as relay 78 are attached to and revolve with engine crankcase 11. Two batteries are shown to facilitate static and dynamic balancing of the engine. When relay contacts 79 close, the starting motor 80 is connected across batteries 76 and 77 through heavy copper conductors and the heavy starting current is limited to this circuit. Starting motor 80 has its stator fixed to the engine crankcase 11 and its rotor cranks the engine shaft 18 through the usual arrangements of gears and throw-out clutch. The ignition circuit for the spark plugs is of the usual design and is not shown in the drawings. Also the usual battery charging generator is not shown on the drawings. Power for auxiliary services in the fuselage can be taken from the batteries and the charging generator by means of brushes and slip rings on shaft 12 in the manner of the prior developed art.

Although an internal combustion engine is used for the power plant in the drawings, it is obvious that other prime movers such as gas turbines can also be used with my invention.

One variation of my invention which utilizes the same principles as the basic design which has been described is to make rotor blades 22 and 23 identical to rotor blades 16 and 17 in size and shape. The two rotor systems would then equally divide the engine power and one-half of the engine power would be transmitted to one of the rotor systems which would not require any speed reducer, gears, transmission, clutch nor free-wheeling coupling.

It is understood that my invention is not limited to the exact form and arrangement described in this application and that variations such as that of shape, number of rotor blades, location of components, relative position of components, details of construction, and combinations with features of the known art are all within the spirit and scope of my invention. For instance, delta-three design can be incorporated in the design of the flapping hinges, lag hinges may be employed, rigid rotor or seesaw rotor design can replace flapping rotor, one slip ring instead of two (and one brush) instead of two can be used for the relay starting circuit by using the engine frame for an electric conductor, and one battery instead of two can be used for starting will mention but a few of the many considerations.

What I claim is:

1. A coaxial rotor helicopter comprising a fuselage, an engine having a body and a shaft, means for rotatably mounting said body on said fuselage for rotation of said body relative to said fuselage about the axis of said shaft, a first hinged rotor, means including a speed reducer for operatively connecting said first rotor to said shaft for rotation about the axis of said shaft, a second rotor having a diameter not greater than the diameter of said first rotor and comprising a plurality of adjustable pitch blades, hinge-connected to said body for rotation therewith about the axis of said shaft, means associated with said second rotor and said fuselage for collectively and cyclically changing the pitch of said second rotor, and means coupled between said fuselage and both rotors for selectively applying a torque to turn said fuselage about the axis of said shaft for providing clockwise and counterclockwise directional control for the fuselage.

2. A coaxial rotor helicopter as claimed in claim 1 in which the diameter of said second rotor is less than the diameter of said first rotor.

3. A coaxial rotor helicopter as claimed in claim 1 wherein a free wheeling coupling is disposed between said first rotor and said speed reducer.

4. A coaxial rotor helicopter as claimed in claim 1 wherein said selective torque coupling means includes a magnet fixed to one of said rotors, a winding fixed to said fuselage in inductive relationship with said magnet, a variable resistor connected across said winding, and means for selectively changing the resistance of said variable resistor.

5. A coaxial rotor helicopter as claimed in claim 4 wherein said selective torque coupling means includes a second magnet fixed to the other of said rotors, a second winding fixed to said fuselage in inductive relationship with said second magnet, a second variable resistor connected across said second winding, and means for selectively changing the resistance of said second variable resistor.

6. A coaxial rotor helicopter as claimed in claim 1 wherein said selective torque coupling means includes a plurality of magnets fixed to one of said rotors, a plurality of windings fixed to said fuselage in inductive relationship with said plurality of magnets, said plurality of windings being connected in a series circuit, a variable resistor connected across said series circuit, and means for selectively changing the resistance of said variable resistor.

7. A coaxial rotor helicopter as claimed in claim 6 wherein said selective torque coupling means includes a second plurality of magnets fixed to the other of said rotors, a second plurality of windings fixed to said fuselage in inductive relationship with said second plurality of magnets, said second plurality of windings being connected in a second series circuit, a second variable resistor connected across said second series circuit, and means for selectively changing the resistance of said second variable resistor.

8. A coaxial birotor helicopter which comprises a fuselage, an engine having its body rotatably mounted on said fuselage for rotation of said body about an upwardly directed axis, a speed reducer having a high speed shaft and a low speed shaft operatively coupled at its high speed shaft to a shaft of said engine, a hinged first rotor coupled to the speed reducer at its low speed shaft for rotation about said axis, a second rotor having a plurality of adjustable pitch blades hinge-connected to the engine body for rotation therewith about said axis, said second rotor being disposed below said first rotor and having a diameter not larger than the diameter of said first rotor, means associated with said second rotor and said fuselage for collectively and cyclically changing the pitch of said second rotor blades, and means coupled between said fuselage and both rotors for selectively applying a torque to turn said fuselage about said axis for providing clockwise and counterclockwise directional control for the fuselage.

References Cited in the file of this patent

UNITED STATES PATENTS

| 1,361,276 | Mott | Dec. 7, 1920 |
| 1,561,424 | Exel | Nov. 10, 1925 |
| 2,269,309 | Herring | Jan. 6, 1942 |
| 2,712,911 | Herrick | July 12, 1955 |

FOREIGN PATENTS

| 422,059 | France | Jan. 10, 1911 |